(12) United States Patent
Abdoul Azizou et al.

(10) Patent No.: US 10,081,400 B2
(45) Date of Patent: Sep. 25, 2018

(54) ONBOARD DIAGNOSTICS OF AN ACTIVE AIR DAM ASSEMBLY

(71) Applicant: GM GLOBAL TECHNOLOGY OPERATIONS LLC, Detroit, MI (US)

(72) Inventors: Abdoul Karim Abdoul Azizou, Whitby (CA); Piranavan Suntharalingam, Scarborough (CA)

(73) Assignee: GM Global Technology Operations LLC, Detroit, MI (US)

( * ) Notice: Subject to any disclaimer, the term of this patent is extended or adjusted under 35 U.S.C. 154(b) by 33 days.

(21) Appl. No.: 15/378,204

(22) Filed: Dec. 14, 2016

(65) Prior Publication Data

US 2018/0162459 A1 Jun. 14, 2018

(51) Int. Cl.
*B62D 35/00* (2006.01)
*B62D 35/02* (2006.01)
*H02P 6/16* (2016.01)

(52) U.S. Cl.
CPC ............... *B62D 35/02* (2013.01); *H02P 6/16* (2013.01)

(58) Field of Classification Search
CPC .................................. B62D 35/02; H02P 6/16
See application file for complete search history.

(56) References Cited

U.S. PATENT DOCUMENTS

| | | | | | |
|---|---|---|---|---|---|
| 5,356,195 | A | * | 10/1994 | Kanda | B62D 35/007 296/146.8 |
| 5,678,884 | A | * | 10/1997 | Murkett | B60K 13/02 180/68.1 |
| 5,812,095 | A | * | 9/1998 | Adrian | H01Q 1/3275 343/713 |
| 5,934,740 | A | * | 8/1999 | Moebius | B62D 35/007 296/180.1 |
| 6,170,904 | B1 | * | 1/2001 | Schaedlich | B62D 35/007 180/903 |
| 6,196,620 | B1 | * | 3/2001 | Haraway, Jr. | B62D 35/007 180/903 |
| 8,960,770 | B2 | * | 2/2015 | De Luca | B62D 37/02 296/180.5 |
| 9,102,366 | B1 | * | 8/2015 | Kim | B62D 35/005 |
| 9,381,957 | B1 | * | 7/2016 | Auden | B62D 35/007 |
| 9,561,827 | B2 | * | 2/2017 | Parry-Williams | B62D 37/02 |
| 9,902,438 | B2 | * | 2/2018 | Bray | B62D 35/007 |
| 2007/0063541 | A1 | * | 3/2007 | Browne | B62D 35/00 296/180.1 |

(Continued)

*Primary Examiner* — Lori L Lyjak
(74) *Attorney, Agent, or Firm* — Quinn IP Law (57) ABSTRACT

A vehicle includes a body and an active air dam assembly. The body has a first end facing an ambient airflow and a second end facing away from the ambient airflow. The assembly is disposed at the first or second end and controls the ambient airflow between the body and a road surface. The assembly includes an adjustable flap, an actuator, sensors, and a controller. The flap shifts between different stowed and deployed positions. The actuator moves the flap, e.g., via a shaft. Each sensor measures a separate performance parameter of the actuator. The controller executes a method to receive the measured performance parameters, identify a fault mode of the air dam assembly from among different possible fault modes using the performance parameters, and execute a control action corresponding to the identified fault mode.

20 Claims, 4 Drawing Sheets

(56) References Cited

U.S. PATENT DOCUMENTS

| | | | | |
|---|---|---|---|---|
| 2008/0116717 A1* | 5/2008 | Honeycutt | ............ | B62D 35/007 |
| | | | | 296/180.5 |
| 2013/0238198 A1* | 9/2013 | Prentice | ................ | B62D 35/02 |
| | | | | 701/49 |
| 2013/0257093 A1* | 10/2013 | del Gaizo | ............... | B62D 35/02 |
| | | | | 296/180.5 |
| 2015/0232138 A1* | 8/2015 | Parry-Williams | ...... | B62D 35/02 |
| | | | | 296/180.5 |
| 2016/0297295 A1* | 10/2016 | Wolf | .................... | B60K 11/085 |
| 2017/0088193 A1* | 3/2017 | Heil | ........................ | B62D 35/00 |
| 2017/0092022 A1* | 3/2017 | Heil | ..................... | B62D 35/005 |
| 2017/0151984 A1* | 6/2017 | Bray | .................... | B62D 35/007 |

* cited by examiner

Fig-5

ONBOARD DIAGNOSTICS OF AN ACTIVE AIR DAM ASSEMBLY

INTRODUCTION

The disclosure relates to a system and method for performing onboard diagnostics for an active air dam assembly. Motor vehicles utilize ambient airflow to cool powertrain components situated in an underhood compartment. Ambient airflow may enter the underhood compartment from beneath the vehicle body or through a front grille opening. An actuator-controlled air dam assembly, also variously referred to as an active gurney, a front splitter, or a front spoiler, may be positioned below or integrated with a front bumper of the vehicle. A deployable air dam door or flap is selectively deployed or stowed with respect to the ambient airflow so as to control the amount of ambient airflow entering the underhood compartment. Additionally, the position of the flap can be adjusted to generate a desired aerodynamic downforce on the vehicle body in order to enhance overall vehicle dynamics and handling.

SUMMARY

A system and method are disclosed herein for automatically diagnosing a fault mode in an active air dam assembly of the type generally described above. The air dam assembly may include an adjustable flap that is actuated by a flap motor or other actuator. As part of closed-loop control of the flap actuator, a position, a current draw, and a back-electromotive force (back-EMF) of the flap actuator may be individually sensed or calculated by a controller. For instance, a position sensor may be used to measure an output position of the flap actuator, e.g., of a rotor shaft thereof, from which a relative position of the flap may be determined, or the flap position may be directly measured. However, if the flap position differs from a controller-commanded flap position, the controller cannot ordinarily determine, absent use of the present method, whether the position sensor or the flap has failed. The present disclosure is therefore intended to help address this potential performance issue without requiring the use of addition sensor hardware, while at the same time enabling accurate identification of a root cause of a detected fault mode.

To accurately isolate the root cause of a given fault mode of the active air dam assembly, the controller may be configured to processes certain actuator performance parameters, including the current draw and back-EMF of the flap actuator and possibly any associated voltage or current pulses. Current draw of the flap actuator may be directly measured via a current sensor, or it may be calculated from other available electrical values such as a measured voltage and a calibrated resistance, as is well known in the art. In order to measure the back-EMF, a pulse width modulation (PWM) signal to the flap actuator may be discontinued for a calibrated duration. When the PWM signal is switched off, a detectable voltage and current spike are generated. One of these spikes may be detected and used by the controller as a timing mechanism to trigger measurement of the back-EMF as set forth herein.

Additionally, the current draw is proportional to a load or torque applied to the flap actuator. Therefore, a variation in the current draw may be detected and used as set forth herein to determine a load/torque variation of the flap actuator concurrently with a commanded deployed or stowed position of the flap. An increase in the current draw of the flap actuator is treated herein as an indication that the flap actuator is doing the expected work in moving the adjustable flap to a commanded deployed position, and vice versa. If the measured position does not correlate with the measured current draw, the controller may register a corresponding position sensor fault, e.g., by recording a diagnostic code and/or taking other suitable control actions. When the flap position sensor data and the current draw correlate sufficiently well, but reflect a flap position that is different from the commanded flap position, the controller may instead determine that the flap itself has failed and instead register a flap fault.

A flap fault is also detectable using the recognition that back-EMF is inversely proportional to a load or torque acting on the flap actuator. Measuring the back-EMF allows the controller to closely monitor the load whenever the flap is commanded to deploy or to stow. Thus, a flap fault may be detected and registered when the back-EMF varies by more than a calibrated amount from an expected variation value during a deployment of the flap.

In a particular embodiment, a vehicle includes a vehicle body and an active air dam assembly. The vehicle body has a first end facing an ambient airflow and a second end facing away from the ambient airflow. The active air dam assembly is disposed at the first or second end of the vehicle body and is configured to control an ambient airflow between the vehicle body and a road surface. Additionally, the active air dam assembly includes an adjustable flap, a flap actuator, a plurality of sensors, and a controller. The flap actuator is configured to shift the flap between a stowed position having a first height relative to the road surface and a deployed position having a second height relative to the road surface, with the first height being greater than the second height. The flap actuator is configured to move the adjustable flap anywhere between and inclusive of the stowed position and the deployed position. Each of the sensors is operable for measuring a separate performance parameter of the flap actuator.

The controller in this embodiment is configured to receive the measured performance parameters, identify a fault mode of the air dam assembly from among a plurality of different fault modes using the performance parameters, and execute a control action corresponding to the identified fault mode.

In some embodiments, the flap actuator may be an electric motor, e.g., a brushless DC motor.

The possible fault modes may include a first fault mode indicative of a fault or malfunction of the adjustable flap, a second fault indicative of a fault or malfunction of the flap actuator, and a third fault indicative of a fault or malfunction of one of the sensors.

The sensors may include a current sensor operable for measuring a current draw of the flap actuator, a voltage sensor operable for measuring a back-EMF of the flap actuator, and a position sensor operable for measuring a relative position of the flap actuator, and thus of the adjustable flap coupled thereto.

The control action corresponding to the identified fault mode may include registering or recording of a corresponding diagnostic code indicative of the identified fault mode.

A method is also disclosed for diagnosing performance of an active air dam assembly in the vehicle noted above. The method includes measuring a set of performance parameters of the flap actuator using a plurality of sensors, and also identifying a fault mode of the air dam assembly from among a plurality of different fault modes using the performance parameters to thereby diagnose the performance of the air dam assembly. Additionally, the method includes executing a control action corresponding to the identified fault mode, which may be achieved via a controller in certain embodiments.

The above features and advantages, and other features and advantages of the present disclosure, will be readily apparent from the following detailed description of the embodiment(s) and best mode(s) for carrying out the disclosure when taken in connection with the accompanying drawings and appended claims.

DETAILED DESCRIPTION

Figure 1:
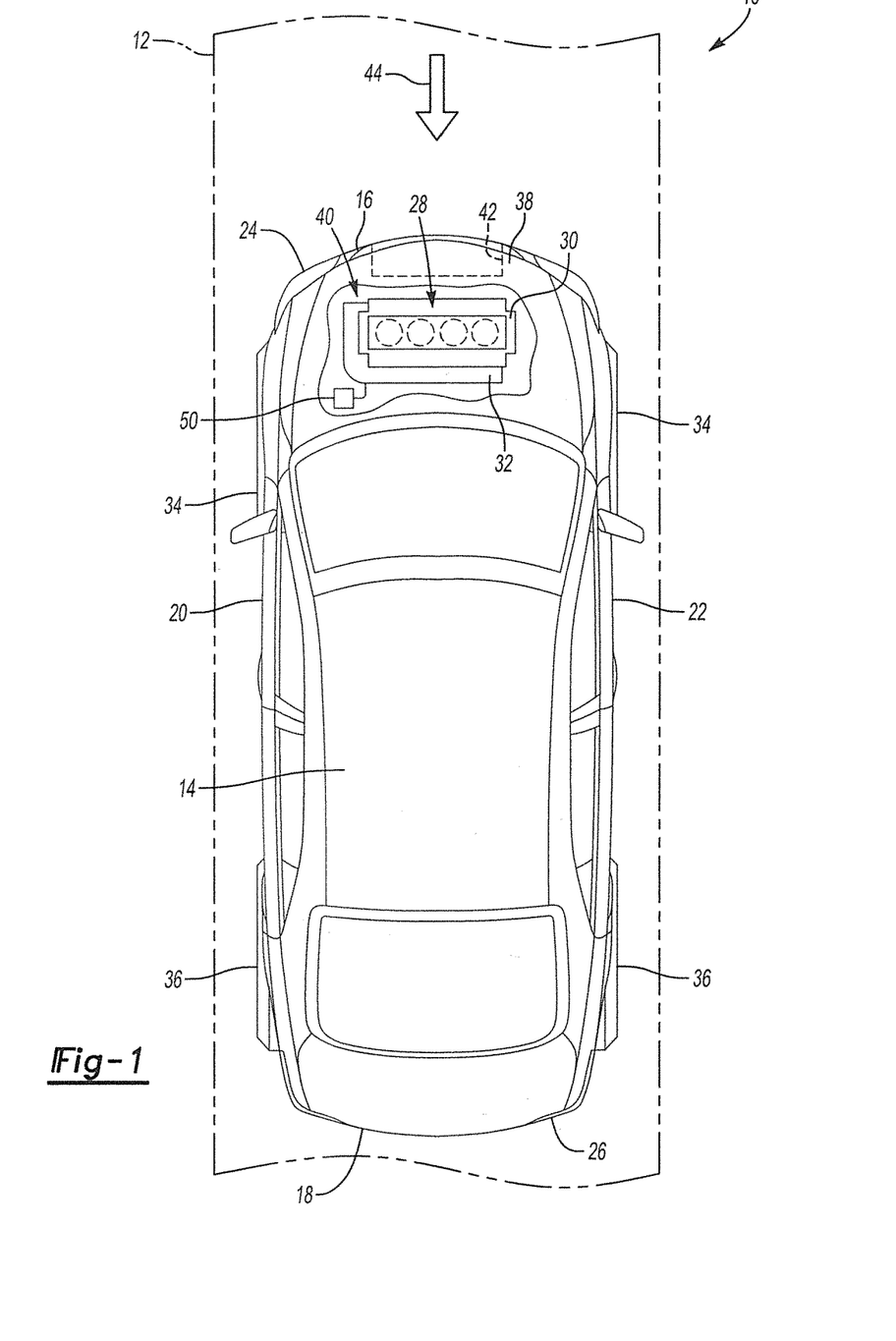
FIG. 1 is a schematic top view of an example vehicle having an active front air dam assembly as set forth herein.

Referring to the drawings, wherein like reference numbers refer to like components, FIG. 1 shows an example vehicle 10 positioned relative to a road surface 12. The vehicle 10 includes an active air dam assembly 42 and a controller 50, with the controller 50 configured to regulate ongoing operation of the active air dam assembly 42. As explained below in detail with reference to FIGS. 2-5, the controller 50 is also configured to perform onboard diagnostics of the active air dam assembly 42 and thereby identify specific fault modes of the air dam assembly 42 from among a plurality of different possible fault modes as explained in detail herein.

The vehicle 10 of FIG. 1 includes a vehicle body 14. The body 14 in turn defines two body ends, i.e., a first or front end 16 and a second or rear end 18. The body also defines two lateral sides, i.e., a left side 20 and a right side 22, with the terms "front", "rear", "left", and "right" referring to the perspective of an operator seated in a typical forward-facing driving position. The front and rear ends 16 and 18 may include a respective bumper assembly 24 and 26. While shown as a front active air dam assembly 42 in FIG. 1, those of ordinary skill in the art will appreciate that the air dam assembly 42 may be used either or both of ends 16 and/or 18 of the vehicle 10 in different embodiments.

The vehicle 10 also includes a powertrain 28 configured to propel the vehicle 10. The powertrain 28 may include an internal combustion engine 30 and a transmission 32. The powertrain 28 may also or alternatively include one or more motor/generators and/or a fuel cell, none of which are shown, but an alternative powertrain 28 employing such devices is appreciated by those skilled in the art. The vehicle 10 also includes a plurality of wheels 34 and 36. Depending on specific configuration of the powertrain 28, power from the engine 30 may be transmitted to the road surface 12 through rotation of the wheels 34 and/or 36.

As also shown in FIG. 1, the vehicle body 14 may include a hood 38 that is configured to cover a portion of the front end 16 of the body 14 to define an underhood compartment 40. The active air dam assembly 42 is configured to control an ambient airflow (arrow 44) from outside of the vehicle 10, i.e., from the ambient, into and through the underhood compartment 40 in order to cool components of the powertrain 28.

Figure 2:
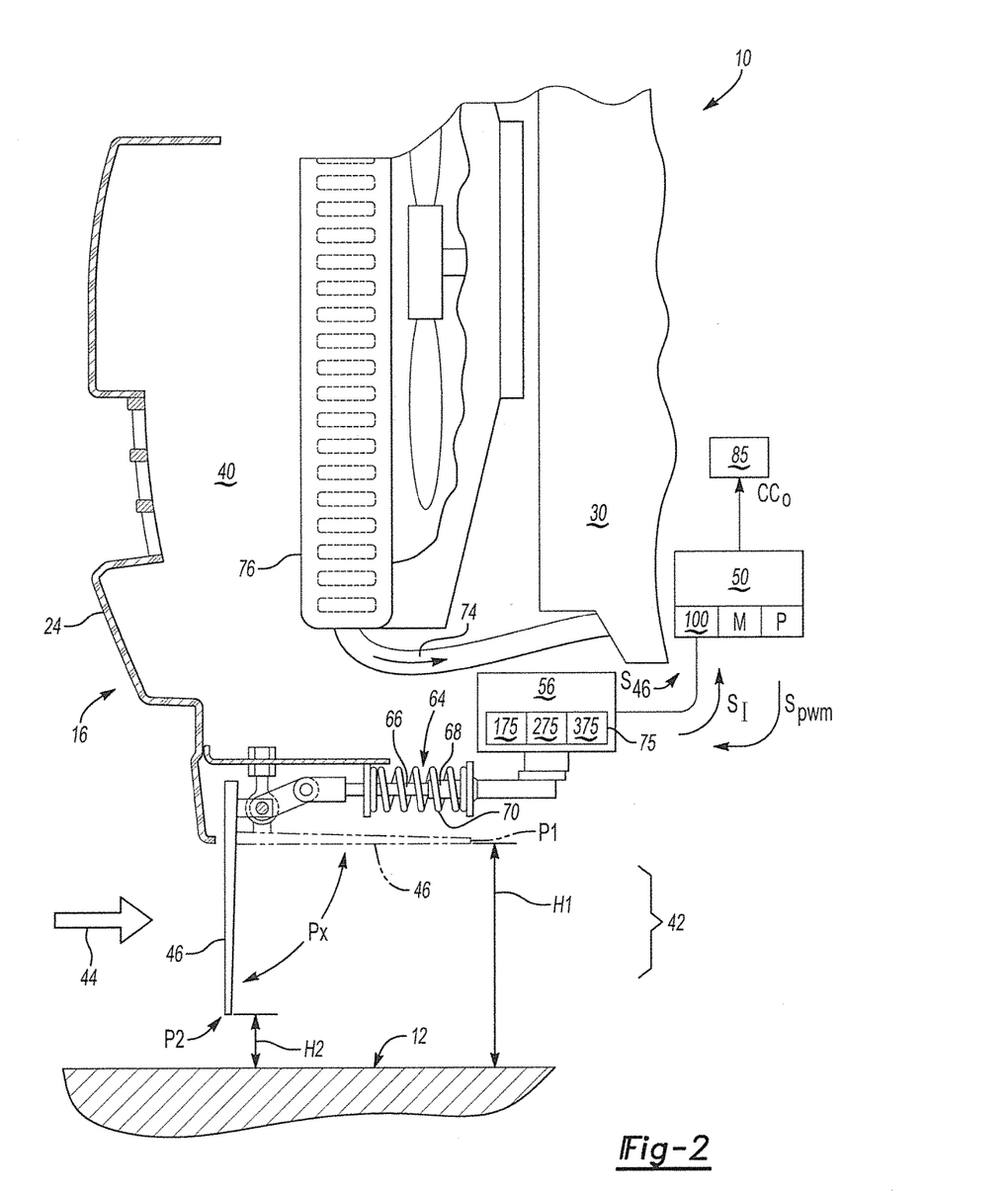
FIG. 2 is a partial cross-sectional side view illustration of a possible embodiment of the active front air dam assembly shown in FIG. 1.

As shown in FIG. 2, a flap 46 of the active air dam assembly 42 has a variable position indicated by double-headed arrow $P_X$. The flap 46, e.g., a panel or door, may be optionally coupled to a shaft 64 or other suitable coupling mechanism that is configured to rotate or otherwise position the flap 46 anywhere between and inclusive of a first/stowed position (P1) and a second/deployed position (P2). Generally, openings located at the front of the vehicle 10, such as a gap between the flap 46 and the road surface 12, as well as various protruding features on the body 14, will tend to disturb the flow of air around the body 14, and thus degrade the aerodynamic signature of the vehicle 10. Therefore, the controller 50 may be programmed or otherwise configured to coordinate operation of the air dam assembly 42 with operation of the powertrain 28 of FIG. 1. Specifically, when the flap 46 is moved to the stowed position P1 at a first height H1 above the road surface 12, the aerodynamic signature of the vehicle 10 is improved but cooling of the powertrain 28 is reduced, while the reverse is true when the flap 46 is moved to the deployed position P2 at a lower second height H2 above the road surface 12.

Additionally, the active air dam assembly 42 of FIG. 2 includes a flap actuator 56 coupled to the flap 46, e.g., via the shaft 64. The flap actuator 56, which may be optionally embodied as a brushed direct current (DC) motor or other suitable motor, rotary actuator, or linear actuator, may imparts a drive torque to the shaft 64 or other coupling mechanism to shift the flap 46 between the respective stowed and deployed positions P1 and P2. The shaft 64 may be optionally embodied as a unitary element or may include a plurality of components, e.g., two distinct rod components 66 and 68 configured to telescope relative to each other with a spring member 70 positioned between the rod components 66 and 68 to preload the rod components 66 and 68 and optionally permit the rod component 66 to nest inside the rod component 68 under an axial load.

Also as shown in FIG. 2, the engine 30 is cooled by a fluid 74 circulated through a heat exchanger 76 housed in the underhood compartment 40. The ambient airflow 44 controlled by the active air dam assembly 42 is then passed through the heat exchanger 76 to cool the fluid 74 after the fluid 74 passes through the engine 30. Therefore, the controller 50 may control operation of the flap actuator 56 according to a load on the engine 30 to help remove excess heat from the fluid 74 and thus provide engine cooling, as is well known in the art.

As an input to the method 100 described below, the controller 50 receives sensed performance parameters (arrow $S_f$) from a plurality of sensors 75 of the flap actuator 56. The performance parameters (arrow $S_f$) may include a position, an electrical current draw, and a back-electromotive force (back-EMF) of the flap actuator 56. To measure such performance parameters (arrow $S_f$), the sensors 75 may include a position sensor 175, a current sensor 275, and a voltage sensor 375 of the types known in the art, e.g., Hall-effect sensors, encoders, ammeters, voltmeters, and the like, with the required values used in the method 100 thereafter calculated as needed by the controller 50.

The controller 50 in turn may be embodied as one or more computer devices having the requisite memory (M) and a processor (P), as well as any other necessary hardware and software, e.g., a clock or timer, input/output circuitry, etc. Memory (M) includes sufficient amounts of read only memory, for instance magnetic or optical memory, on which is recorded computer-readable instructions embodying the method 100. As part of the method 100, the controller 50 may generate and transmit output signals (arrow $CC_O$) to an indicator device 85 such as a lamp or a display screen, and/or may register a fault or fault code, e.g., via recoding of a bit flag or diagnostic code corresponding to a particular fault mode. As noted above, in order to accurately identify and isolate a root cause of a given fault mode or malfunction of the active air dam assembly 42 of FIGS. 1 and 2 from other possible fault modes, i.e., to differentiate whether the flap 46, the flap actuator 56, or the position sensor 175 has experienced a malfunction, the controller 50 processes the performance parameters (arrow $S_I$) via the processor P.

In order to time the measurement of the back-EMF, a pulse width modulation signal (arrow $S_{PWM}$) delivered from the controller 50 or another control device to the flap actuator 56 may be temporarily discontinued by the controller 50 for a calibrated duration, either measured or detected via an electrical current or voltage spike as set forth below, before measuring the back-EMF via the voltage sensor 375. This duration should be long enough to let any residual current in the flap actuator 56 to fully dissipate before measuring this permitted to stall. The required time for the current to settle depends on the inductance of the windings of the flap actuator 56, as is well known in the art. Back-EMF could also be calculated from available electrical values in another embodiment.

Figure 5:
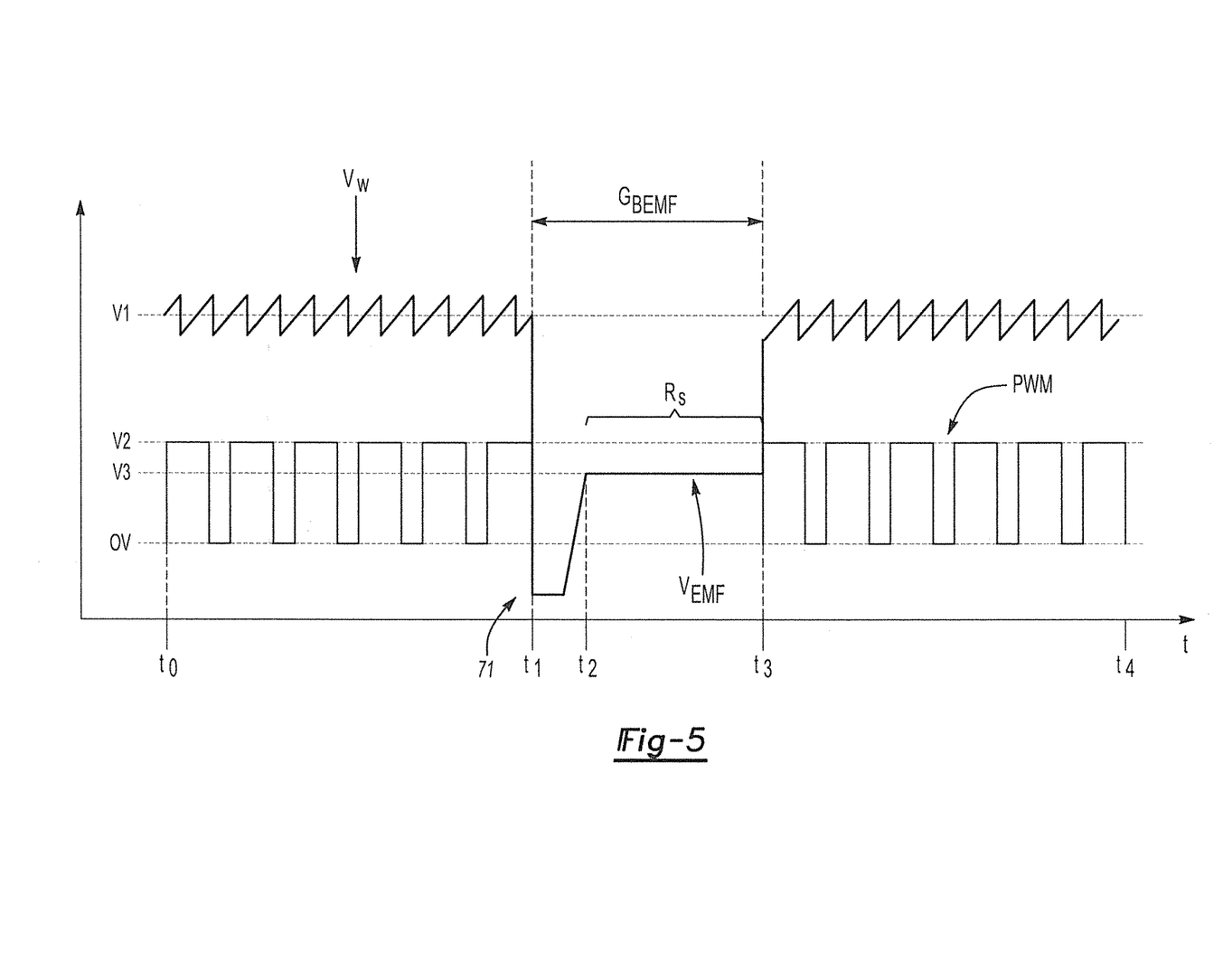
FIG. 5 is a graphical plot depicting changing amplitude of representative performance parameters on the vertical axis and time on the horizontal axis.

Referring briefly to FIG. 5, which depicts amplitude (A) on the vertical axis and time (t) on the horizontal axis, between time $t_0$ and $t_1$ the controller 50 of FIGS. 1 and 2 maintains the pulse width modulation signal (labeled PWM, corresponding to signal $S_{PWM}$ of FIG. 2) to generate a modulated voltage command ($V_W$) to windings of the flap actuator 56, e.g., a flap motor in this example. The PWM signal, ranging from 0V to a higher voltage represented nominally as V2, is turned off or discontinued at $t_1$, at which point a detectable electrical spike 71 occurs in the modulated voltage command ($V_W$) having a midpoint voltage of V1. The detected presence of the electrical spike 71, either a voltage spike as shown or a related current spike, may prompt the controller 50 to count through the calibrated duration noted above, with the duration $t_1$ to $t_3$ providing a back-EMF measurement gap ($G_{BEMF}$) in which the controller 50 can measure the back-EMF, shown as trace $V_{EMF}$. A stable back-EMF region ($R_S$) exists between times $t_2$ and $t_3$ within which optimal back-EMF measurement accuracy is possible, with voltage V3 corresponding to the measured back-EMF ($V_{EMF}$). The time period between $t_1$ and $t_2$ represents a field collapse due to inductors (not shown) in any PWM switching circuit (not shown) dumping their charge after discontinuation of the PWM signal (arrow PWM). The actual value of the $V_{EMF}$ will vary with the load on the flap actuator 56, and is directly proportional to the speed of the flap actuator 56.

Once back-EMF measurement is complete, the controller 50 may next command the flap actuator 56 to turn back on again at $t_3$ and continue to some future time point $t_4$. A malfunctioning air dam assembly 42 is detectable using the fact that back-EMF is inversely proportional to a load applied to the flap actuator 56. Measuring the back-EMF thus enables the controller 50 to the load on the flap actuator 56 whenever the flap 46 of the active air dam assembly 42 is commanded to deploy or to stow. That is, a malfunction of the flap 46 may be detected when back-EMF variation exceeds an expected calibrated value during a commanded deployment of the flap 46.

Figure 3:
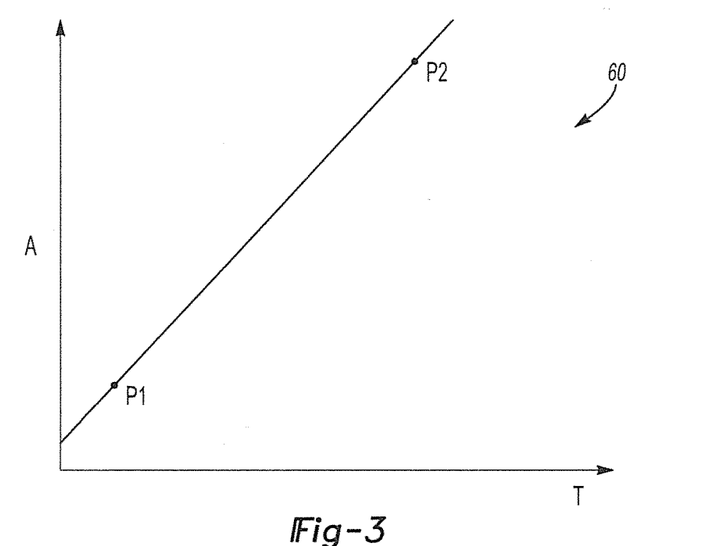
FIG. 3 is a schematic plot of current draw of an example flap motor used as a flap actuator in the example active front air dam assembly of FIGS. 1 and 2 versus motor torque, with current draw depicted on the vertical axis and motor torque depicted on the horizontal axis.

To describe this point in further detail, a plot 60 in FIG. 3 depicts motor current draw of the flap actuator 56 in amps, with an amplitude (A) depicted on the vertical axis and motor load in terms of torque (T) on the horizontal axis. The motor current draw of the flap actuator 56 is proportional to the load or torque applied by the flap actuator 56 as noted above. That is, wherein the flap 46 is in the stowed position P1 of FIG. 2, the controller 50 would ordinarily expect to see a low current draw and a low motor torque. Similarly, wherein the flap 46 is in the deployed position P2, the controller 50 would expect to see a high current draw and a correspondingly high motor torque. Therefore, the controller 50, as part of the method 100, may consider any variation in the current draw of the flap actuator 56 in determining the load/torque variation that is expected, i.e., should be observed in conjunction with a commanded stowed or deployed position P1 or P2 of the flap 46. The calculated load or torque variation from the current draw, in other words, may be compared to an expected load or torque variation of the flap 46. Such a variation can be used to detect a failure of the flap 46 to deploy or stow when the flap 46 is so commanded.

Additionally, any increase in current draw may be used by the controller 50 as an indication that the flap actuator 56 is actually doing the requested work needed in moving the flap to the commanded stowed or deployed position P1 or P2. If the sensor 175 of FIG. 2 dedicated to sensing position does not correlate with the current draw, a position sensor fault may be automatically set by the controller 50. When the flap position sensor and current draw correlate well, but both are different from a commanded flap position from the controller 50, the controller 50 instead determines that the flap 46 has failed and registers or records an appropriate bit flag or diagnostic code.

Figure 4:
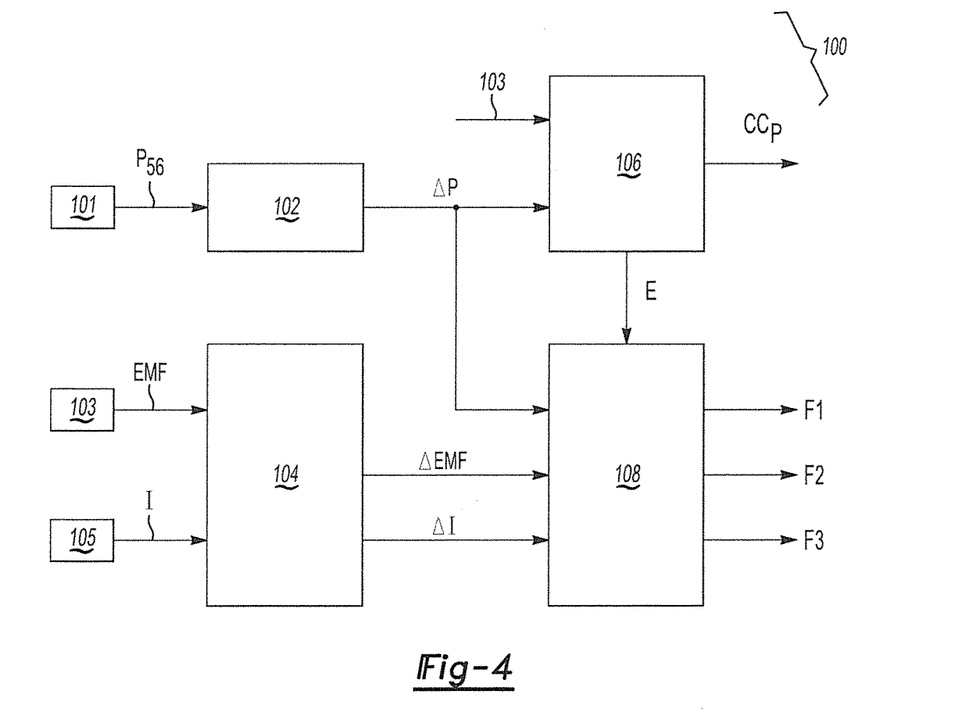
FIG. 4 is a logic flow diagram describing an example method for implementing the disclosed onboard diagnostics for the active air dam assembly shown in FIGS. 1 and 2.

The method 100 is described with particular reference to FIG. 4 which depicts logic blocks 101-108, used interchangeably herein as process steps. Logic blocks 101, 103, and 105 are collectively used in identifying a fault mode of the active air dam assembly 42 from among a plurality of different fault modes using the measured or calculated performance parameters (arrow $S_I$), and to thereby diagnose the performance of the active air dam assembly 42. Thereafter, the method 100 includes executing a control action corresponding to the identified fault mode.

In particular, logic blocks 101, 103, and 105 respectively embody the process steps of measuring a position of the flap 46 via the position sensor 175 of FIG. 2 (block 101), which could entail measuring an angular position of the flap actuator 56 coupled to the flap 46. Additionally, the method 100 includes measuring the back-EMF (block 103) as noted above with reference to FIG. 5, and measuring the current draw (block 105). The measured position of the flap 46 (arrow $P_{56}$) is then fed into logic block 102, while the measured back-EMF (arrow EMF) and current draw (arrow I) are both fed into logic block 104.

Logic block 102 may entail processing the signals from block 101 to determine a position variation (ΔP) of the measured position signal from a commanded position, i.e., a position commanded by the controller 50 and thus known as a reference value. The position variation (ΔP) is then fed forward into separate diagnostic blocks 106 and 108.

Logic block 104 entails processing the signals from steps 103 and 105 to determine variation in back-EMF (ΔEMF) and variation in current draw (ΔI) from expected back-EMF and current, respectively, for the commanded position of the flap 46. Block 104 outputs the back-EMF variation (ΔEMF) and current variation (ΔI) to logic block 108.

At logic block 106, the controller 50 determines from the commanded position and the position variation (ΔP) from logic block 102 whether the active air dam assembly 42 is functioning properly, i.e., whether the commanded position is the same as the actual or measured position of the flap 46 or of the flap actuator 56. If so, the controller 50 generates a passing output signal (arrow CC$_P$), which may be optionally registered as a passing bit flag or diagnostic code. However, if logic block 106 determines that the position variance (ΔP) exceeds a calibrated threshold, the method 100 enables further diagnostics of the active air dam assembly 42 via transmission of an enabling signal (E) to logic block 108.

Logic block 108 is configured to differentiate between three different possible fault modes: a fault of the position sensor 175 of the sensors 75 shown in FIG. 2, a fault of the flap actuator 56, and a fault of the flap 46. In addition to the enabling signal (E), inputs to logic block 108 include the position variation (ΔP), the back-EMF variation (ΔEMF), and the current variation (ΔI) noted above. Outputs from logic block 108 may include a first fault signal F1 corresponding to a position sensor fault, a second fault signal F2 corresponding to a failure or fault of the flap actuator 56, and a third fault signal F3 corresponding to a failure or fault of the flap 46.

In order to detect and isolate a root cause of the failure, the current variation (ΔI) can be used to detect a failure to deploy or stow the flap 46. An increase in motor current draw is an indicator that flap actuator 56 is actually doing the work required to deploy, while a decrease in current draw indicates that the flap 46 is being stowed. If the position sensor value does not correlate with the increased or decreased motor current, the controller 50 sets the first fault signal F1 indicating the position sensor is faulty.

For the second fault signal F2, which once again indicates a failure of the flap actuator 56, the controller 50 determines whether the current draw of the flap actuator 56 corresponds to an expected value based on the commanded flap position. For example, if the controller 50 commands deployment of the flap 46, the controller 50 would expect to see an increased current draw as indicated by P2 in FIG. 3. If a lower than expected current draw is detected, however, the controller 50 registers the second fault signal F2 indicating the flap actuator 56 has failed.

When the position sensor 175 and the measured current draw correlate well, but both are different from a commanded position of the flap 46, the controller 50 determines that the flap 46 has failed. As a result, the controller 50 records the third fault signal F3. Alternatively, the controller 50 may determine whether to set the third fault signal F3 by evaluating the back-EMF. As noted above, back-EMF is inversely proportional to the load applied to the flap actuator 56. Thus, the load on the flap actuator 56 can be monitored by the controller 50 when the flap 46 is commanded to deploy or stow. A flap malfunction warranting the third fault signal F3 is detected when the back-EMF variation (ΔEMF) is greater than an expected calibrated value during deployment of the flap 46 or less than the same or another calibrated value during stowing of the flap 46.

Using the method 100 disclosed herein, stability of the vehicle 10 of FIG. 1 may be improved by increasing the assurance that the flap 46 of the active air dam system 42 has been deployed or stowed when commanded to do so by the controller 50. The present method 100 allows a higher level of confidence in the accuracy of the aerodynamic downforce developed by the active air dam assembly 42. Additionally, cost benefits may be realized by virtue of the fact that no additional sensors or other hardware are required to implement the teachings set forth herein and identify the root cause of various malfunctions in the active air dam assembly 42, allowing a technician to quickly trace, pinpoint, and repair the fault.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:
1. A vehicle comprising:
 a vehicle body; and
 an active air dam assembly coupled to the vehicle body and configured to control an ambient airflow between the vehicle body and a road surface, the active air dam assembly including:
  an adjustable flap;
  a flap actuator configured to move the adjustable flap via the shaft anywhere between and inclusive of a stowed position having a first height relative to the road surface and a deployed position having a second height relative to the road surface, wherein the first height is greater than the second height;
  a plurality of sensors, each of which is operable for measuring a separate performance parameter of the flap actuator; and
  a controller configured to receive the measured performance parameters from the plurality of sensors, identify a fault mode of the active air dam assembly from among a plurality of different possible fault modes using the received performance parameters, and execute a control action corresponding to the identified fault mode.

2. The vehicle of claim 1, wherein the flap actuator is a motor.

3. The vehicle of claim 2, wherein the motor is a brushless direct current motor.

4. The vehicle of claim 1, wherein the fault modes include a first fault mode indicative of a fault or malfunction of the adjustable flap, a second fault mode indicative of a fault or malfunction of the flap actuator, and a third fault mode indicative of a fault or malfunction of one of the plurality of sensors.

5. The vehicle of claim 4, wherein the plurality of electrical sensors includes a current sensor operable for measuring a current draw of the flap actuator, a voltage sensor operable for measuring a back-electromotive force of the flap actuator, and a position sensor operable for measuring a relative position of the flap actuator, and wherein the third fault mode is indicative of a fault or malfunction of the position sensor.

6. The vehicle of claim 5, wherein the control action corresponding to the identified fault mode includes registering or recording of a diagnostic code in memory of the controller to indicate the identified fault mode.

7. An active air dam assembly for controlling an ambient airflow between a vehicle body and a road surface, the active air dam assembly comprising:
  an adjustable flap;
  a shaft coupled to the adjustable flap and configured to shift the adjustable flap between a stowed position having a first height relative to the road surface and a deployed position having a second height relative to the road surface, wherein the first height is greater than the second height;
  a flap actuator coupled to the shaft and configured to move the adjustable flap via the shaft anywhere between and inclusive of the stowed position and the deployed position;
  a plurality of sensors, each of which is operable for measuring a separate performance parameter of the flap actuator; and
  a controller configured to receive the measured performance parameters from the sensors, identify a fault mode of the active air dam assembly from among a plurality of different fault modes using the received performance parameters, and execute a control action corresponding to the identified fault mode.

8. The active air dam assembly of claim 7, wherein the flap actuator is a motor.

9. The active air dam assembly of claim 8, wherein the motor is a brushless direct current motor.

10. The assembly of claim 7, wherein the fault modes include a first fault mode indicative of a fault or malfunction of the adjustable flap, a second fault indicative of a fault or malfunction of the flap actuator, and a third fault indicative of a fault or malfunction of one of the plurality of sensors.

11. The active air dam assembly of claim 10, wherein the plurality of sensors includes a current sensor operable for measuring a current draw of the flap actuator, a voltage sensor operable for measuring a back-electromotive force of the flap actuator, and a position sensor operable for measuring a relative position of the flap actuator or the adjustable flap, and wherein the third fault mode is indicative of a fault mode of the position sensor.

12. The active air dam assembly of claim 11, wherein the control action corresponding to the identified fault mode includes recording a diagnostic code indicative of the identified fault mode.

13. A method for diagnosing performance of an active air dam assembly in a vehicle having a vehicle body, wherein the active air dam assembly includes a flap having a position that is adjustable anywhere between and inclusive of a stowed position having a first height relative to the road surface and a deployed position having a second height relative to the road surface, wherein the first height is greater than the second height, and a flap actuator configured to move the flap between the stowed and deployed positions to control an ambient airflow between the vehicle body and a road surface, the method comprising:
  measuring a set of performance parameters of the flap actuator using a plurality of sensors;
  identifying a fault mode of the active air dam assembly from among a plurality of different possible fault modes using the measured performance parameters to thereby diagnose the performance of the active air dam assembly; and
  executing a control action corresponding to the identified fault mode.

14. The method of claim 13, wherein the flap actuator is a motor.

15. The method of claim 14, wherein the motor is a brushless direct current motor.

16. The method of claim 13, wherein identifying a fault mode includes identifying a first fault mode indicative of a fault or malfunction of the adjustable flap, a second fault mode indicative of a fault or malfunction of the flap actuator, and a third fault mode indicative of a fault or malfunction of one of the plurality of sensors.

17. The method of claim 16, wherein measuring a set of performance parameters includes measuring a current draw of the flap actuator via a current sensor, measuring a back-electromotive force of the flap actuator via a voltage sensor, and measuring a relative position of the flap actuator via a position sensor.

18. The method of claim 17, further comprising:
  calculating a load or torque variation of the flap actuator using the measured current draw; and
  comparing the calculated load or torque variation of the flap actuator to an expected load or torque variation of the flap.

19. The method of claim 17, wherein measuring the back-EMF of the actuator includes discontinuing a pulse width modulation (PWM) signal to the flap actuator, detecting a voltage spike in the PWM signal after discontinuing the PWM signal, and then measuring the back-EMF via a voltage sensor only after detecting the voltage spike.

20. The method of claim 13, wherein executing the control action includes recording a diagnostic code indicative of the identified fault mode.

* * * * *